United States Patent [19]

Imanara et al.

[11] Patent Number: 5,364,584
[45] Date of Patent: Nov. 15, 1994

[54] PROCESS FOR PRODUCING FIBER-REINFORCED RESIN MOLDINGS

[75] Inventors: Tohru Imanara, Atsugi; Shoichi Satou, Sagamihara; Naomi Yamashita, Machida, all of Japan

[73] Assignee: Mitsubishi Kasei Corporation, Tokyo, Japan

[21] Appl. No.: 961,248

[22] Filed: Oct. 16, 1992

[30] Foreign Application Priority Data

Oct. 25, 1991 [JP] Japan .................. 3-306628

[51] Int. Cl.$^5$ .............. B29C 45/02; B29C 45/14; B29C 45/34
[52] U.S. Cl. .................. 264/510; 264/257; 264/310; 264/328.7; 264/328.11
[58] Field of Search .............. 264/257, 258, 510, 511, 264/572, 513, 102, 328.1, 328.7, 328.4, 552, 310, 328.11

[56] References Cited

U.S. PATENT DOCUMENTS

| | | | |
|---|---|---|---|
| 3,028,284 | 4/1962 | Reeves | 264/257 |
| 3,309,450 | 3/1967 | Rodgers | 264/257 |
| 4,002,715 | 1/1977 | Usui | 264/257 |
| 4,353,862 | 10/1982 | Kaman, II | 264/257 |
| 4,810,444 | 3/1989 | Alberino et al. | 264/102 |
| 5,023,041 | 6/1991 | Jones et al. | 264/510 |
| 5,093,067 | 3/1992 | Gibson | 264/328.1 |
| 5,162,092 | 11/1992 | Klobucar et al. | 264/513 |
| 5,244,613 | 9/1993 | Hurley et al. | 264/328.1 |

*Primary Examiner*—Jay H. Woo
*Assistant Examiner*—Duane S. Smith
*Attorney, Agent, or Firm*—Nixon & Vanderhye

[57] ABSTRACT

A process for producing a fiber-reinforced resin molding, which includes placing a fiber reinforcement in the cavity of a mold composed of a top force and a bottom force; closing the mold, slanting the mold at an angle of 15° to 90° degrees, rejecting a liquid resin material into the cavity; curing the resin material; and after completion of curing, opening the mold to withdraw the molding therefrom, therein the inside of the cavity is brought into a pressurized state by a pressurized gas during the period after completion of injection of the liquid resin material till gelation of the resin material, and such a pressurized state is maintained until completion of curing.

5 Claims, 4 Drawing Sheets

: 1

PROCESS FOR PRODUCING FIBER-REINFORCED RESIN MOLDINGS

BACKGROUND OF THE INVENTION

The present invention relates to a process for producing fiber-reinforced resin moldings and, more particularly, to a process for producing fiber-reinforced resin moldings having few cells by structural reaction injection molding (SRIM).

SRIM is a technique for producing fiber-reinforced resin moldings according to the reaction injection molding (RIM) method.

An ordinary practical mode of SRIM is illustrated in FIG. 4. According to this SRIM method, fiber-reinforced resin moldings are produced in the following way.

A fiber reinforcement 11 is placed in the cavity 8 of a mold 3 consisting of top force 1 and bottom force 2. After closing the mold, a liquid resin material 12 is injected into the cavity and cured. After curing has been completed, the mold 3 is opened and the produced molding is withdrawn therefrom.

Injection of the liquid resin material is performed by impingement-mixing the starting liquid resin materials by a mixing head 4 and then passing the mixed material into the mold cavity 8 through a resin material discharged port 5, a runner 6 and a gate 7 under an injection pressure of usually about 0.5 kg/cm$^2$ G. In the inside of the mixing head 4 are provided the circulation paths (not shown) prepared for the respective components of the resin material, and in these circulation paths are disposed the orifices opposing to each other. Mixing of the liquid resin materials is accomplished by the instantaneous impingement-mixing of the resin materials when passing through the orifices.

In the moldings obtained by RIM, it is often practiced to blend a foaming agent or other additives or to blow a gas into the resin materials for attaining a reduction of weight of the moldings or for preventing dimensional shrinkage on curing, thereby making many tiny cells contain in the moldings. Such method is carried out in production of RIM moldings of polyurethane, polyurea, polyamide and the like.

In the case of the SRIM moldings, on the other hand, it is usually undesirable to contain the cells, because these moldings, unlike the RIM moldings, are used mainly for structural materials for which strength and stiffness are important factors. Further, the presence of the cells lowers impregnation of the liquid resin material into the fiber reinforcement and also impairs transparency of the moldings to reduce their commercial value.

However, even if SRIM molding is carried out without blending any foaming agent, the resulting moldings tend to contain the cells, due to the presence of cells in the liquid resin material, vapors of the said resin material and air in the mold, in case of using the ordinary method.

The object of the present invention is to provide a process for producing fiber-reinforced resin moldings having few cells or voids by SRIM.

As a result of extensive studies for attaining the said object, it has been found that by bringing the interior of the mold cavity into which a liquid resin material has been injected, into a pressurized state by introduction of a pressurized gas, in the process for production of fiber-reinforced resin moldings by SRIM, cells in the moldings has been remarkably reduced in number. The present invention has been attained on the basis of this finding.

SUMMARY OF THE INVENTION

In an aspect of the present invention, there is provided a process for producing fiber-reinforced resin moldings, which comprises: placing a fiber reinforcement in a cavity-forming portion of a mold composed of a top force and a bottom force having in its inside the cavity-forming portion; closing the mold; injecting a liquid resin material into the cavity from a mixing head through a liquid resin material discharge port; introducing an inert gas into the inside of the mold during the period after completion of injection of the liquid resin material till gelation of the liquid resin material, so as to bring the inside of the cavity into a pressurized state, such a pressurized state being maintained until completion of curing; and after curing, opening the mold to withdraw the molded product from the mold.

DETAILED DESCRIPTION OF THE INVENTION

Figure 1:
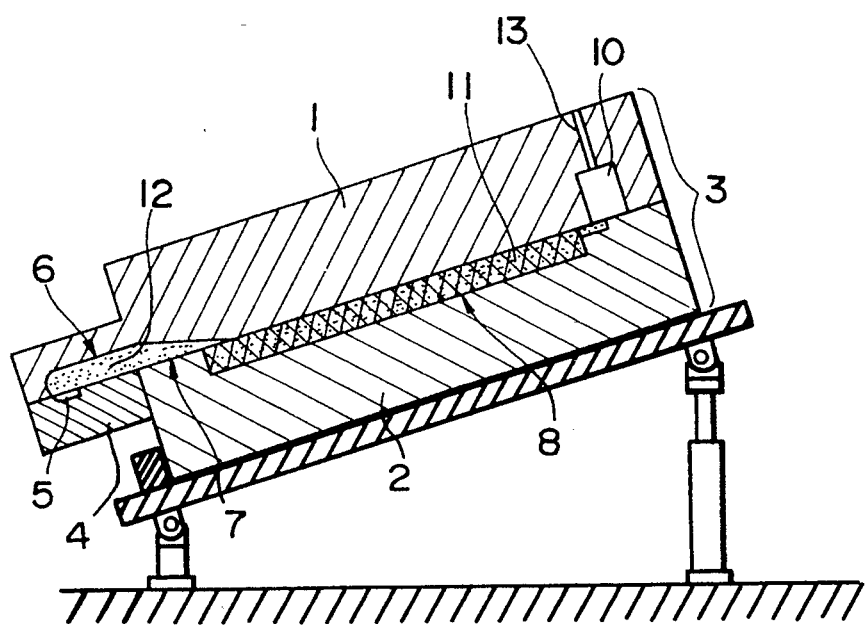
FIG. 1 is a schematic illustration of an embodiment of practice of SRIM according to the present invention.

As for the reinforcing fiber constituting the fiber reinforcement in the present invention, such fiber is not specifically defined and various known fiber can be used. Examples of the usable fibers include glass fiber, carbon fiber, alumina fiber, boron fiber, silicon fiber, aromatic polyamide fiber, polyester fiber and a mixture thereof. As to the form of the fiber reinforcement, it is usually used in the form of mat, textile or the like, and it may also be used by combining these forms. The length of the fibers constituting a mat or the like is also not specified in the present invention, but a greater fiber length, is preferred for increasing the mechanical strength.

As the liquid resin material, there can be used in the present invention various known thermosetting or thermoplastic resins which can be molded by a reaction injection molding machine. These starting resins are generally of a two-pack or three-pack system, and usually the resin material is injected into the cavity after impingement-mixing in the mixing head and is cured in the cavity.

The viscosity of the liquid resin material depends on the mold temperature and mixing ratio, but it is preferable to keep the viscosity of the said resin material as low as possible, specifically 50 cp or less, till the moment when the said resin material is injected into the mold cavity after mixed up sufficiently.

The curing rate is preferably so adjusted that it retains low during the time when the resin material is being charged into the mold, but after completion of charging, the curing rate raises up to quickly complete the curing reaction. Specifically, it is preferred to adjust the curing rate so that the time required for curing is not more than 10 minutes, more preferably not more than 5 minutes, still more preferably not more than 3 minutes.

Preferred examples of the thermosetting resins usable in the present invention are epoxy resin, vinyl ester resin, unsaturated polyester, phenol resin, bismaleimide resin, urethane resin, polyurea, and polyisocyanurate. A thermosetting resin obtained by polymerizing an allyl-, vinyl-, acrylic- or methacrylic-type monomer having carbon-carbon double bonds and a norbornene-type polymerizable monomer or oligomer thereof can be also used favorably. As the thermoplastic resin, there can be used polyamide, polycarbonate and the like.

Each of the said resins takes its form after the resin material has been injected in the form of monomer, prepolymer, etc., into the cavity 8 and cured therein. The monomer, etc., used here may contain proper additives such as reactive diluent, catalyst, internal release agent, etc.

The process of the present invention is described below.

The process for producing fiber-reinforced resin moldings according to the present invention is explained with reference to FIGS. 1 to 3 and FIGS. 5 to 7.

The reference numerals used in the drawings are as follows:

1: top force, 2: bottom force, 3: mold, 4: mixing head, 5: liquid resin material discharge port, 6: runner, 6′: runner-forming portion, 7: gate, 7′: gate-forming portion, 8: cavity, 8′: cavity-forming portion, 9: liquid reservoir space-forming portion, 10: liquid reservoir space, 11: fiber reinforcement, 12: liquid resin material, 13: hole.

Figure 2:
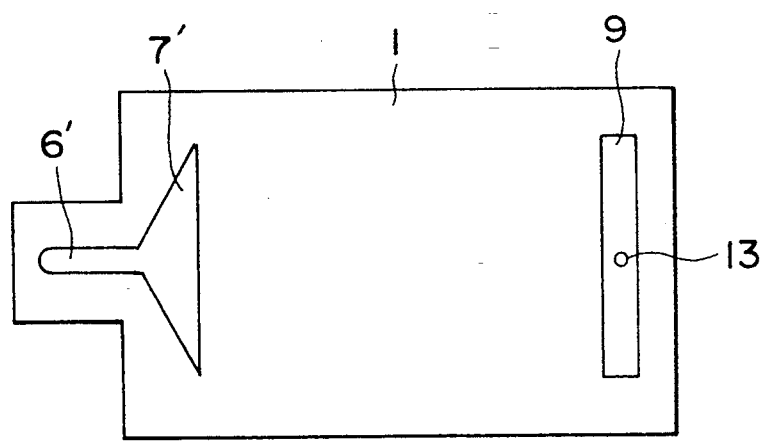
FIG. 2 is an exploded top plan view of the embodiment shown in FIG. 1.
Figure 3:
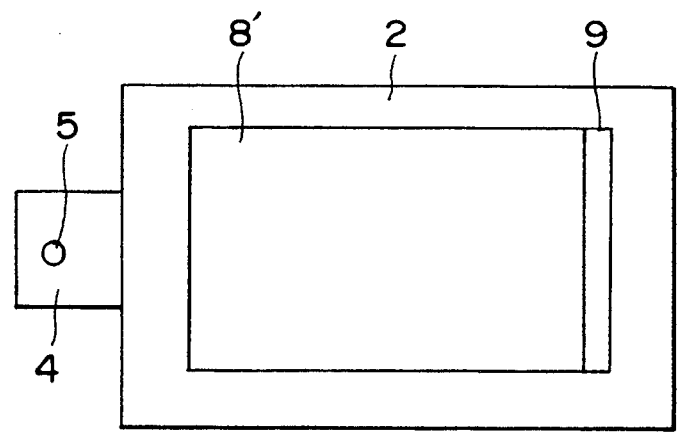
FIG. 3 is another exploded top plan view of the embodiment shown in FIG. 1.

In the embodiment shown in FIGS. 1 to 3 of the present invention, a fiber reinforcement is placed in the cavity-forming portion 8′ and the top force 1 and the bottom force 2 are joined to close the mold. Then a liquid resin material is injected into the cavity 8 via the mixing head 4, the liquid resin material discharge port 5, the runner 6 and the gate 7. The inside of the cavity 8 is brought into a pressurized state by introducing a pressurized gas during the period after completion of injection of the liquid resin-material till gelation of the said resin material. This pressurized state is maintained until completion of curing. After curing, the mold is opened and the molded product is withdrawn from the mold, thereby obtaining a fiber-reinforced resin molding having few cells and/or voids.

Figure 5:
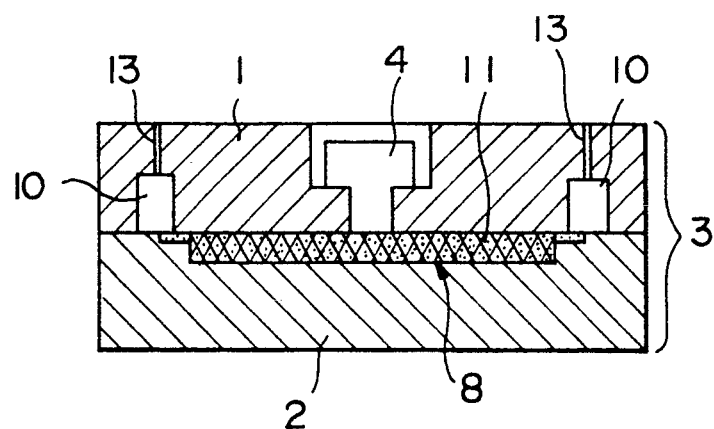
FIG. 5 is a schematic illustration of another embodiment of practice of SRIM according to the present invention.
Figure 6:
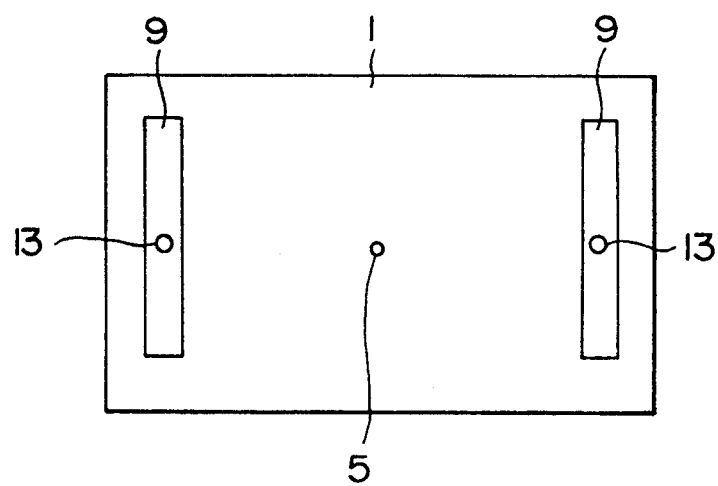
FIG. 6 is an exploded top plan view of the embodiment shown in FIG. 5.
Figure 7:
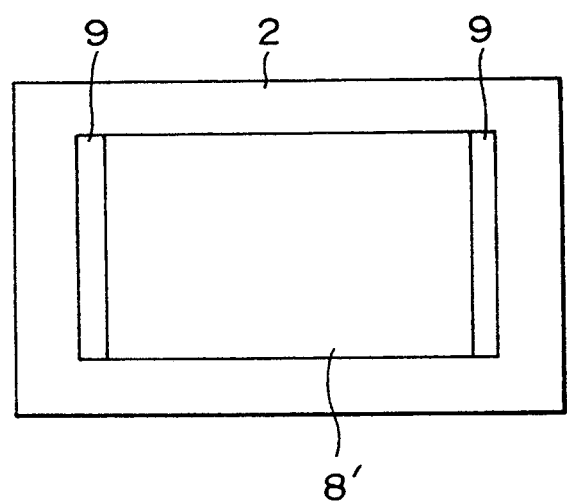
FIG. 7 is another exploded top plan view of the embodiment shown in FIG. 5.

In the another embodiment shown in FIGS. 5 to 7 of the present invention, a fiber reinforcement is placed in the cavity-forming portion 8′ and the top force 1 and the bottom force 2 are joined to close the mold; then a liquid resin material is injected into the cavity 8 via the mixing head 4 and the liquid resin material discharge port 5; the inside of the cavity 8 is brought into a pressurized state by introducing a pressurized gas during the period after completion of injection of the liquid resin-material till gelation of the said resin material, this pressurized state being maintained until completion of curing; and after curing, the mold is opened and the molded product is withdrawn from the mold, thereby obtaining a fiber-reinforced resin molding having few cells and/or voids.

The mold 3 may be either metallic or resin-made. The surface of the cavity 8 is preferably finished beforehand to high smoothness by polishing or other means. This is important for bettering surface smoothness and mold release characteristics of the moldings. The mold temperature may be properly decided according to the curing temperature of the liquid resin material.

In FIGS. 1 to 3 of the present invention, when the liquid resin material is injected into the cavity, the said resin material is preferably injected from the lower part thereof and let run upwardly. The mixing head 4 of the mold is a head for side gate and mounted to the side of the bottom force 2. The liquid resin material discharge port 5 is positioned at the parting surface of the top force 1 and the bottom force 2. According to this type of mixing head, the liquid resin material which has been mixed up through impingement while passing through the orifices in the circulation paths in the said mixing head is forced to flow upwardly, discharged out from the liquid resin material discharge port 5 and supplied into the runner 6. The resin material at this point is indicated by numeral 12. As the liquid resin material is injected from a lower part and let run upwardly, the cells and vapors contained in the liquid resin material tend to gather in the upper portion in the cavity and liquid reservoir space, and consequently, the cells which are apt to cause improper impregnation of the liquid resin material, can be effectively reduced by the action of a pressurized gas.

In FIG. 5 to 7 of the present invention, the mixing head 4 of the mold is mounted to a center portion of the top force 1. The liquid resin material discharge port 5 is positioned below the mixing head 4, and the liquid resin material which has been mixed up through impingement while passing through the orifices in the circulation paths in the said mixing head is forced to flow downwardly, discharged out the cavity 8 from the liquid resin material discharge port 5. As the liquid resin material is injected from the upper portion and let run in all directions, the cells and vapors contained in the liquid resin material tend to gather in the end portions of the cavity and liquid reservoir spaces, and consequently, the cells which are apt to cause improper impregnation of the liquid resin material, can be effectively reduced by the action of a pressurized gas.

The method of injection may be the one which is ordinary used in reaction injection molding. The operating conditions such as temperature, pressure, etc., may be properly decided in consideration of the properties of the liquid resin material used, performance required for the molding and other factors. The injection amount is decided by considering the volume of the molding to be formed, fiber content and other factors.

In FIGS. 1 to 3 of the present invention, it is preferable to use a movable mold and to properly slant the mold so that the liquid reservoir space 10 is inclined upwardly and the gate is positioned at a lower level. This is shown in FIG. 1 with the mold in an inclined position. Such slanting of the mold causes the cells to gather in the upper section of the cavity or liquid reservoir space and enhances the cell reducing effect by the pressurized gas described later. It is preferred that the angle of slant of the mold may be properly selected from the range of 15° to 90°.

In the present invention, the inside of the cavity is brought into a pressurized state by a pressurized gas during the period after completion of injection of the liquid resin material till gelation of the said liquid resin material, and such a pressurized state is maintained until completion of curing. Such a pressurized state in the cavity let reduce the cells contained in the molding before cured (liquid resin material and fiber reinforcement in the cavity), and consequently, the liquid resin material moves into the spaces vacated by the cells, thereby preventing generation of the portions where the fiber reinforcement 11 has not been impregnated.

It is not clarified a reason why the cells contained therein are decreased by the pressurized state, but this phenomenon is considered attributable to such factors as squashing of the cells, their volumetric shrinkage and their dissolution into the liquid resin material which are induced under the action of pressurization.

As to the pressurized gas, inert gases are not specifically defined and a various inert gas which won't induce a chemical reaction with fiber reinforcement or liquid resin material, can be used. As examples of usable inert gas, air, nitrogen or the like is preferably used. A method of bringing the inside of the cavity into a pressurized state in the embodiment shown in FIGS. 1 to 3 is to introduce an inert gas into the runner 6, the gate 7 and the air reservoir space 10. Especially, introduction of an inert gas into the liquid reservoir space 10 through a hole 13 is a preferable method. A method of bringing the inside of the cavity into a pressurized state in the embodiment shown in FIGS. 4 to 7 is to introduce an inert gas into the air reservoir spaces 10 through a holes 13.

As for the degree of pressurization, the higher the better in principle, but actually, due to the operational restrictions of the apparatus, such as injecting pressure of the liquid resin material injector, clamping force of the clamping device, etc., the degree of pressurization applied in the present invention is usually in the range of 1 to 20 kg/cm G, preferably 2 to 10 kg/cm G, more preferably 3 to 7 kg/cm G.

A pressurized state may be brought about at any time during the period after completion of injection of the liquid resin material till gelation of the said liquid resin material, but it is preferred to pressurize immediately after completion of injection when the viscosity of the liquid resin material is still low. Pressurization may be begun concurrently with start of injection or during injection of the liquid resin material, but in this case, since the pressure due to flow pressure loss of the resin is given in addition to the pressure of the pressurized gas around the gate 7 in the mold 3, it is necessary to give some allowance for the injection pressure and the clamping force.

According to the process of the present invention, it is possible to easily produce the moldings containing few cells therein, having a very excellent state of impregnation of the liquid resin material into the fiber reinforcement and substantially free of craters due to the cells in the surface.

EXAMPLES

The present invention will be further illustrated below with reference to the examples. It is to be understood, however, that the present invention is in no way limited by these examples but may be embodied otherwise without departing from the scope and spirit of the invention.

In the following examples, there were used the mold and the materials specified below.

(1) Mold in FIG. 1

A metal mold having a platen with a size of 1,020 mm×510 mm and a cavity of 3 mm in deep was used. The mold was provided with a gate at one end of the cavity and a liquid reservoir space at the other end of the cavity.

Figure 4:
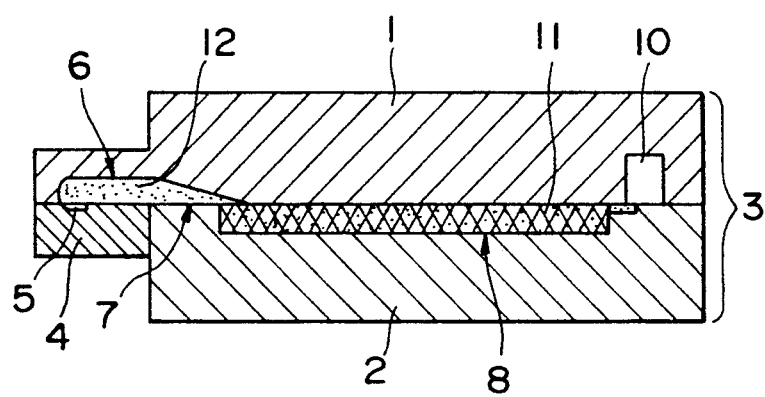
FIG. 4 (prior art) is a schematic illustration of an ordinary (prior art) practical embodiment of SRIM.

(2) Mold in FIG. 4

A metal mold having a platen with a size of 1,020 mm×510 mm and a cavity of 3 mm in deep was used. The mold was provided with a liquid resin material discharge port at center of an upper surface of the cavity and a liquid reservoir space at both ends of the cavity.

(2) Liquid resin materials

There were used the following A and B.

A: A 50:50 (by weight) mixture of bisphenol F-type glycidyl ether and glycidyl methacrylate (SY Monomer G, produced by Sakamoto Yakuhin Co., Ltd.

B: A 106:5:1 (by weight) mixture of methyltetrahydrophthalic anhydride, 2-ethyl-4-methylimidazole and 1,1-bis(tert-butylperoxy)-3,3,5-trimethylcyclohexane (PERHEXA 3M, produced by Nippon Yushi (3) Fiber reinforcement A 1,015×505 mm glass-fiber mat with a unit weight of 1,800 g/m².

EXAMPLE 1 (FIGS. 1 to 3)

The fiber reinforcement was placed in the cavity, and the top and bottom forces were clamped with a clamping force of about 70 tons. The mold temperature was kept at 120° C. for both top and bottom forces.

The mold was slanted at an angle of about 80° to the floor surface, lowering the gate side down. Then the resin materials A and B were mixed through impingement by a mixing head in an epoxy equivalent ratio of 10:8, and the mixed material was immediately injected into the cavity. The injection amount of the liquid resin material has been previously determined so that the liquid level would reach substantially the middle of the liquid reservoir space.

When injection of the liquid resin material was completed, the pressure of the air phase in the liquid reservoir space has reached about 0.5 kg/cm² G. Pressurized air was immediately introduced into the liquid reservoir space to adjust the pressure in the cavity to 3 kg/cm² G. The cavity was maintained under this pressure until curing was completed. After curing of the liquid resin material was completed, the mold was opened and the molded product was withdrawn therefrom.

The molded product thus obtained had a very excellent state of impregnation of the liquid resin material into the fiber reinforcement and presented high transparency although it contained about 25 vol % of fiber reinforcement.

COMPARATIVE EXAMPLE 1 (FIG. 4)

The procedure of Example 1 was followed except that introduction of pressurized air was omitted.

The resulting molded product had many cells of various sizes and assumed a generally milk-white vague color. The resin-impregnated solidified glass fibers were seen exposed at some parts of the surface.

EXAMPLE 2 (FIGS. 4 to 7)

The fiber reinforcement was placed in the cavity, and the top and bottom forces were clamped with a clamping force of about 70 tons. The mold temperature was kept at 120° C. for both top and bottom forces.

The resin materials A and B were mixed through impingement by a mixing head in an epoxy equivalent ratio of 10:8, and the mixed material was immediately injected into the cavity. The injection amount of the liquid resin material has been previously determined so that the liquid level would reach substantially to the liquid reservoir space.

When injection of the liquid resin material was completed, the pressure of the air phase in the liquid reservoir space has reached about 0.5 kg/cm$^2$ G. Pressurized air was immediately introduced into the liquid reservoir space to adjust the pressure in the cavity to 3 kg/cm$^2$ G. The cavity was maintained under this pressure until curing was completed. After curing of the liquid resin material was completed, the mold was opened and the molded product was withdrawn therefrom.

The molded product thus obtained had a very excellent state of impregnation of the liquid resin material into the fiber reinforcement and presented high transparency although it contained about 25 vol % of fiber reinforcement.

What is claimed is:

1. A process for producing fiber-reinforced resin moldings, which comprises the steps of:

placing a fiber reinforcement in a cavity-forming portion formed inside a bottom force;

closing a top force having in the inside thereof a runner-forming portion, a gate-forming portion and a liquid reservoir space-forming portion, a bottom force having in the inside thereof a cavity-forming portion so disposed as to communicate at one end thereof with the gate-forming portion of the top force when closed, a liquid reservoir space-forming portion disposed at the other end of the cavity-forming portion so as to form a liquid reservoir space when closed, and a liquid resin material discharge port so disposed as to communicate with the runner-forming portion when closed, thereby forming a mold;

slanting the mold at an angle of 15° to 90° so as to incline the liquid resin material discharge port downwardly and to position the liquid reservoir space at upper level;

injecting a liquid thermosetting or thermoplastic resin material into a cavity formed by closing the top force and bottom force, from a gate through a runner formed by closing the top force and bottom force and the liquid resin material discharge port positioned above a mixing head, while flowing upwardly the liquid resin material from the liquid resin material discharge port, so as to gather cells and vapors contained in the liquid resin material in the upper portion in the cavity and liquid reservoir space;

introducing an inert gas at a liquid reservoir space into the inside of the mold during the period after completion of injection of the liquid resin material until gelation of the liquid resin materials, so as to pressurize the inside of the cavity and maintaining the pressurized state until completion of curing; and after curing, opening the mold to withdraw the molded product from the mold.

2. The process according to claim 8, wherein the fiber reinforcement is at least one selected from the group consisting of glass fiber, carbon fiber, alumina fiber, boron fiber, silicon fiber, aromatic polyamide fiber and polyester fiber.

3. The process according to claim 8, wherein the liquid resin material is selected from the group consisting of epoxy resin; vinyl ester resin; phenol resin; bismaleimide resin; urethane resin; thermosetting resin composed of an allyl-, vinyl-, acrylic- or methacrylic-type monomer having carbon-carbon double bonds and a norbornene-type polymerizable monomer or oligomer; polyamide; and polycarbonate.

4. The process according to claim 8, wherein the inert gas is air or nitrogen.

5. The process according to claim 8, wherein the inside of the cavity is maintained under a pressure of 1–20 kg/cm$^2$G.

* * * * *

UNITED STATES PATENT AND TRADEMARK OFFICE
CERTIFICATE OF CORRECTION

PATENT NO. : 5,364,584
DATED : November 15, 1994
INVENTOR(S) : IMANARA ET AL

It is certified that error appears in the above-indentified patent and that said Letters Patent is hereby corrected as shown below:

COLUMN 8:

Claims 2, 3, 4, and 5, line 1 of each, delete "8", insert --1--.

Signed and Sealed this

Twenty-first Day of March, 1995

Attest:

BRUCE LEHMAN

Attesting Officer    Commissioner of Patents and Trademarks